Dec. 2, 1924.

J. ELDER

PIPE COUPLING

Filed July 22, 1921

1,517,893

INVENTOR.
John Elder
BY Helen E. Sibell, Executrix,

ATTORNEYS.

Patented Dec. 2, 1924.

1,517,893

UNITED STATES PATENT OFFICE.

JOHN ELDER, DECEASED, LATE OF BROOKLYN, NEW YORK; BY HELEN ELDER SIBELL, EXECUTRIX, OF BROOKYLN, NEW YORK.

PIPE COUPLING.

Application filed July 22, 1921. Serial No. 486,851.

*To all whom it may concern:*

Be it known that I, HELEN ELDER SIBELL, a citizen of the United States, and resident of the borough of Brooklyn, county of Kings, city and State of New York, am an executrix of the last will and testament of JOHN ELDER, deceased, late a citizen of the United States, and resident of the borough of Brooklyn aforesaid, who in his lifetime did invent certain new and useful Improvements in Pipe Couplings, of which the following is a specification.

This invention relates to devices for establishing a reliable connection between pipes or similar bodies through which a fluid is adapted to pass. The embodiments of the invention illustrated in the accompanying drawings include certain features disclosed in Letters Patent of the United States, No. 1,365,025 issued to the said John Elder on January 11, 1921, but the scope of the present invention will be indicated in the appended claims.

Figure 1:
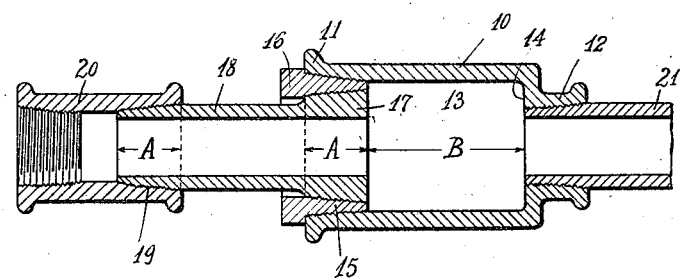
Figure 2:
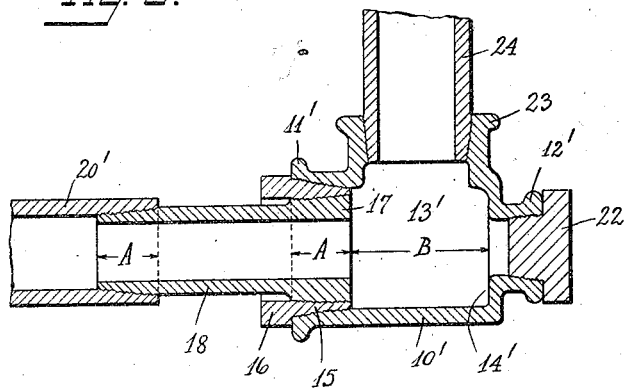

Figures 1 and 2 of the drawings show two forms of the improved coupling, in longitudinal section, and illustrate them in the applied position.

In Figures 1 and 2 the improved coupling comprises three parts, viz; a body, a bushing screwed into said body, and a nipple adapted to screw into said bushing.

In detail, the construction illustrated by Figure 1 is as follows: The tubular body 10 is provided at one end with a connection 11 having an internal screw thread which tapers or contracts from said end toward the other end of the body, at which there is provided another tubular connection 12, likewise having an internal screw thread which is tapered or contracted toward the interior chamber 13 of the body 10. As shown, the internal diameter of the connection 12 is smaller than that of said chamber 13, thus forming a shoulder 14 within said chamber. Into the connection 11 is screwed a bushing 15, provided with an exterior taper thread of proper pitch and direction to fit said connection, and to facilitate screwing this bushing home to a tight fit, it may be provided with a projecting head 16, preferably of angular outline, for the application of a suitable wrench. The bushing 15 also has an interior screw thread which tapers or contracts away from the chamber 13 instead of toward the same, and which is of a direction opposite to that of the exterior thread of said bushing. That is to say, if the external thread of the bushing is left-handed (as it generally will be) the interior thread of the bushing will be right-handed, and vice-versa. The inner thread of the bushing 15 is adapted to receive a correspondingly formed taper thread at the enlarged end 17 of a nipple 18, the other end of which has a thread 19 tapering toward the free end of the nipple. The two threads at the ends of the nipple are of different diameters, but they taper in the same direction and practically at the same angle, and they are also of the same length axially, as indicated at A; moreover, these two nipple threads are of the same pitch and are both right-handed (or both left-handed, if the interior thread of the bushing should be left-handed).

The three parts so far described constitute the improved coupling as it would be sold to the purchaser; the parts 20 and 21 with which the coupling is shown connected would be supplied by the user. It will be noted that the length B of the chamber 13 is slightly more than twice the length A of one of the nipple threads. The purpose and advantage of this special relation has been fully set forth in the Elder patent mentioned above, and it will not be necessary to repeat such explanation here at length. It will also be evident that the nipple can be unscrewed from the bushing and retracted into the chamber 13, the nipple then being loose and having a certain amount of longitudinal play in the chamber 13, but being unable to become separated from the body 10, the bushing on one side, and the shoulder 14 on the other side limiting the longitudinal movement of the nipple when unscrewed from the bushing. It will be obvious that, in the original assembly, the nipple is first inserted in the chamber 13 of the body 10, before the bushing is screwed into the body. The improved coupling is usually shipped and sold in a "collapsed" condition, that is to say, with the nipple unscrewed (inwardly) from the bushing and retracted into the chamber 13. In such retracted position, the free end of the nipple projects but little from the bushing, if at all, and it thus becomes possible to insert the coupling readily between the parts with which it is to be connected, as has been explained in the said Elder patent.

As an illustration of one of the many ways in which this coupling may be used, Figure 1 shows at one side a sleeve 20 screw threaded at both ends internally for connection respectively with the nipple and with a pipe or other body (not shown), while at the other side there is a pipe or fitting 21 having an internal taper thread to fit that of the connection 11. In many cases, as described in the said Elder patent, the pipe or fitting 21 may be connected firmly and permanently with the improved coupling before the latter, together with such pipe or fitting, is brought into position for connecting the nipple with the sleeve 20 or other part. In any event, the placing of said pipe or fitting 21 and of the coupling is effected while the nipple is retracted within the chamber 13 as described above. Then, the nipple is pushed out, lengthwise of the chamber 13, to bring the ends of the nipple into engagement simultaneously with the threads of the sleeve or other part 20 and with the interior threads of the bushing 15 respectively. Since these threads are alike in direction (both right-hand or both left-hand), in pitch, in taper, and in length A, it follows that the nipple will be screwed to a tight joint at both ends at the same time, and there is thus obtained a joint that will remain tight even under high pressure, without packings. In view of the fact that the exterior thread of the bushing 16 is of opposite direction to the interior thread of said bushing (one of them left-handed, and the other right-handed), the screwing of the nipple into the bushing will also tend to tighten the bushing in the body of the coupling, thereby guarding against the danger of leaks which would arise if the bushing were loosened at the time the nipple is screwed into the bushing.

The construction illustrated by Figure 2 is practically the same as above described, as regards the nipple, the bushing, and the connection of the body with said bushing, also in regard to the relation of the lengths, A and B. Instead of the sleeve 20, a pipe 20' has been shown in connection with the free end of the nipple. The connection 12', in line with the nipple connection 11', is illustrated as closed by a plug 22 (although a pipe might be connected at this point in the same manner as the pipe 21 of Figure 1), and at one side of the chamber 13' is shown a third connection 23 into which a pipe 24 or like part may be fitted. The main features and the advantages of this form are the same as described with reference to Figure 1.

I claim as the invention of JOHN ELDER, deceased—

1. A coupling for pipes and other articles, comprising a body having a central chamber and a threaded connection at one side thereof, a bushing screwed into said connection and having an internal screw-thread tapering outwardly and of a direction opposite to the outer screw-thread of the bushing, that is to say, one of said threads of the bushing being left-handed, and the other right-handed, the largest diameter of said internal screw-thread being smaller than the width of said chamber, and a nipple having at its inner end an enlargement tapered outwardly and screw-threaded on said taper to fit the thread on the inside of said bushing, the other end of said nipple having a threaded portion of like pitch and direction of thread as said inner end, and the clearance provided in said chamber for the movement of the nipple lengthwise of its own axis, being at least equal to the combined length of said threaded portions of the nipple.

2. A coupling for pipes and other articles, comprising a body having an internal chamber and an inwardly tapering internal screw-thread at one side of said chamber, a bushing having an inwardly-tapering external thread to fit said screw-thread of the body, and also having an outwardly-tapering internal screw-thread the largest diameter of which is smaller than the width of said chamber, and a nipple having at its inner end an outwardly-tapering external screw-thread to fit the internal thread of the bushing, the other end of said nipple having a threaded portion of like pitch and direction of thread as said inner end, and the clearance provided in said chamber for the movement of the nipple lengthwise of its own axis, being at least equal to the combined length of said threaded portions of the nipple.

In testimony whereof, I have signed this specification at New York, N. Y., this 22nd day of July, A. D. 1921, in the presence of the subscribing witnesses.

HELEN ELDER SIBELL,
*Executrix of John Elder, deceased.*

Witnesses:
JOHN A. KEHLENBECK,
DANIEL MATHI.